United States Patent [19]
Stern

[11] Patent Number: 6,161,107
[45] Date of Patent: Dec. 12, 2000

[54] SERVER FOR SERVING STORED INFORMATION TO CLIENT WEB BROWSER USING TEXT AND RASTER IMAGES

[75] Inventor: Yonatan Pesach Stern, Tel Aviv, Israel

[73] Assignee: Iota Industries Ltd., Tel Aviv, Israel

[21] Appl. No.: 08/962,117

[22] Filed: Oct. 31, 1997

[51] Int. Cl.[7] ................................................ G06F 17/00
[52] U.S. Cl. ............................................ 707/104; 707/10
[58] Field of Search ........................ 395/200.33, 200.61, 395/200.59, 200.31; 707/103, 9, 10, 104, 523, 524, 527, 528; 380/25

[56] References Cited

U.S. PATENT DOCUMENTS

| | | | |
|---|---|---|---|
| 5,404,432 | 4/1995 | Koopman et al. .................... | 707/528 |
| 5,465,326 | 11/1995 | Sawada .................................. | 707/523 |
| 5,535,319 | 7/1996 | Pascoe et al. ........................ | 707/524 |
| 5,754,873 | 5/1998 | Nolan .................................... | 707/527 |

OTHER PUBLICATIONS

Vetter et al., "Mosaic and the World Wide Web", IEEE, 1994, pp. 49–57, 1994.

Lee, "Meteorological Satellite Image Service via WWW", IEEE 1997, pp.575–578.

Anand et al, "The Web Request Broker: A Framework for Distributed Web–Based Applications", http://www.olabcom/www6_1/paper.htr (1997).

TechWeb Technology Encyclopedia, definition of– IIOP, http://www.techweb.comencyclopedia/defineterm.cgi?sstring =iiop (1997).

*Primary Examiner*—Wayne Amsbury
*Assistant Examiner*—Thuy Pardo
*Attorney, Agent, or Firm*—Mark M. Friedman

[57] ABSTRACT

A management system for managing information, in which information is first captured from an original source having an original format, and then converted into an information component. The information component is a software object which includes a pointer to the original information, a method for manipulating the original information and a property of the original information. The information component can be stored in, and retrieved from, a database. Upon being retrieved from a database, the original information can be extracted from the information component and displayed in a substantially similar format as the original information.

5 Claims, 9 Drawing Sheets ically arranged, you have 6,161,107

SERVER FOR SERVING STORED INFORMATION TO CLIENT WEB BROWSER USING TEXT AND RASTER IMAGES

FIELD AND BACKGROUND OF THE INVENTION

The present invention relates to an information component management system. Specifically, the system of the present invention enables documents, images and other types of information to be packaged within an active information component object, which can then be stored, retrieved and manipulated according to content rather than according to form.

Both the amount and format of available information is increasing at a geometric rate. Individuals today face a plethora of choices, both of the type of information which can be obtained, and the method by which the information is obtained. For example, in addition to the traditional print media such as newspapers and magazines, a good deal of news information is available electronically, via the World Wide Web (WWW), through electronic computer mail, by dedicated electronic news services, through a facsimile machine or even on television. All of this information can be obtained relatively easily, yet finding particularly useful information is increasingly difficult if not impossible.

The many different information formats are themselves a source of increasing complexity for information management. Such management includes storing, searching and retrieving available information to find that small fraction which is useful to the user. For example, a particular news item might be available in a paper document, as a picture, from a video stream such as television broadcast, through a voice medium such as radio, or electronically on the World Wide Web. Currently available document management systems can only manage one or two of these formats, often requiring information to be translated from the original source format into a format available to the document management system. In addition, as its name implies, a "document" management system is still tied to the underlying characteristics of a "document".

Documents can be defined as a collection of ideas and information, which are organized within a certain structure. The ideas and information may be logically linked according to various relationships, but as a whole should follow a common theme. The collection itself is expressed as a combination of text and graphic items. There are three main types of information in a document: ideas, data and structure. Ideas can be expressed with words or graphics. Data can be in the form of numbers, symbols, graphics or even sounds. The final element, structure, is an important element of a document, yet it is often overlooked as a separate entity. The structure of a document is the way in which the data and ideas are organized within the document, thereby providing additional significance to these data and ideas.

Current document management systems typically fall into one of two categories. The first category is a structured management system. This system was originally designed to enable searches for information according to specific keywords within defined database fields. Unfortunately, this underlying system design has many disadvantages. For example, the types of performable searches are limited by the structure of the database itself. Furthermore, information must be extracted from the document and entered into the database manually, which is time consuming, expensive and prone to human error. Thus, structured management systems have significant drawbacks for document management.

The alternative category, non-structured retrieval systems, solves certain problems but also creates new difficulties. These systems enable automatic indexing of information, without the need for human intervention. However, in non-structured retrieval systems, only the free text of the document is automatically indexed. Therefore, only free text from the document can be searched. Although free text is an important component of a document, such a system loses the other types of available information. Furthermore, the context of ideas or concepts within a document is largely lost by the automatic indexing procedure, leaving the user with a collection of disconnected textual segments or documents which are divorced from the general theme expressed by the entire document. Thus, the user must often read an entire document or a collection of search results in order to find the desired information.

Therefore, there is an unmet need for, and it would be highly useful to have, an information component retrieval system which stores, manages and retrieves concepts and ideas rather than static documents or document portions.

SUMMARY OF THE INVENTION

According to the present invention, there is provided a management system for managing information, comprising: (a) an IC Publisher for capturing the information from an original information source, storing the information so that the information becomes stored original information, converting said stored original information into a metafile and for transmitting said metafile; (b) an IC Broker for receiving said metafile, for preparing an information component from said metafile, and for storing said information component in a database, said information component being characterized by being a software object, said software object including: (i) a pointer to a storage location of said stored original information; (ii) at least one method for manipulating said stored original information; and (iii) at least one property of said stored original information; and (c) an IC Server for retrieving and displaying said information component.

Preferably, the original information source is selected from the group consisting of print media and electronic media. More preferably, the electronic medium is selected from the group consisting of electronic mail, World Wide Web page, video stream, sound stream and textual information. Preferably, the IC Publisher captures said information by interacting with a software driver, said driver being able to hold said information in an electronic format accessible to said IC Publisher.

According to preferred embodiments of the present invention the IC Publisher further comprises: (a) an IC Capture for capturing the information from an original information source, said original information being captured through an invocation of a software driver for interacting with a software system, said software system being able to access said original information from said original information source; (b) an IC Transformer for storing said original information so that said original information becomes stored original information in a storage location, and converting said stored original information into a metafile; and (c) an IC Transmitter for publishing said metafile. Preferably, the original information source is selected from the group consisting of word processing document, a PDF file, a video stream, an audio stream and a Web page. More preferably, the software system is selected from the group consisting of word processor, facsimile machine software, Web browser and Adobe™ Acrobat™. Most preferably, the software system is said word processor and said software driver is a printer driver. Preferably, the metafile includes a raster image of said original information, a pointer to said storage location of said original information, a text of said original information and at least a portion of coordinates of said text within said original information. More preferably, the metafile is an archive file. Also more preferably, the IC Transformer converts said stored original information according to a process selected from the group consisting of optical character recognition and PDF conversion. Preferably, the IC Transmitter publishes said metafile according to a process selected from the group consisting of transmittal to an object request broker and transmittal to an HTTP daemon.

According to other preferred embodiments of the present invention, the information component is a CORBA object. Alternatively, the information component is selected from the group consisting of a COM object, a Java Bean component having data stored according to the JAR format and a flat file. Preferably, the information component belongs to an information class, said information class belonging to a hierarchy of related classes, such that said information class has a pool of attributes according a location in said hierarchy. More preferably, the hierarchy includes said information class and at least one information sub-class, such that said pool of attributes of said information class is inherited by said at least one information sub-class. Also more preferably, the information class is selected from the group consisting of newspaper class and video stream class. Most preferably, the newspaper class includes at least one information subclass selected from the group consisting of article, page and picture. Also most preferably, the video stream class includes at least one information subclass selected from the group consisting of video clip and video frame.

According to still other preferred embodiments of the present invention, the IC Broker analyzes a content of said information component and classifies said information component in said information class according to said content. Preferably, the content includes textual data, image data and visual attributes. More preferably, the visual attributes are selected from the group consisting of font type, font style and location of said textual information. Preferably, the IC Broker further comprises: (a) a content analyzer for obtaining the information from the metafile; (b) a component identifier for identifying at least one element of the information, said at least one element being selected from the group consisting of text and picture; (c) a component classifier for classifying said at least one element according to a knowledge base; and (d) a component generator for generating the information component as a software object, said software object including: (i) a pointer to a storage location of the information; (ii) at least one method for manipulating the information; and (iii) at least one property of the information. More preferably, the software object is selected from the group consisting of Java Bean object and COM object. Most preferably, the at least one property is selected from the group consisting of object mapping structure, profile, object image, and access control data. Preferably, the object mapping structure includes a structure of said software object, a text of said software object and a picture of said software object, said structure relating said text to said picture such that a visual image of the information is reproducible. Also preferably, the object image is a visual image of the information. Also preferably, the access control data determines accessibility to said software object. More preferably, the system further includes an IC Manager for storing and retrieving said information component. Most preferably, the IC Manager includes a plurality of CORBA-compliant software objects. Also most preferably, the software objects are Cartridges.

According to yet other preferred embodiments of the present invention, the IC Server communicates with said IC Broker through a CORBA-compliant object request broker.

According to other preferred embodiments of the present invention, the IC Server displays said retrieved information in a visual display. Preferably, the IC Server displays said retrieved information by printing onto paper. Also preferably, the system further comprises a client Web browser for requesting stored information and said IC Server further comprises: (a) a database for storing said stored information; and (b) an image processor for accessing said stored information from said database and transforming said stored information into a Searchable Image Format (SIF) file, said SIF file being accessible by said client Web browser, such that said stored information is displayable by said client Web browser. More preferably, the SIF file includes: (a) a raster image of the stored information; (b) a text of the stored information; and (c) a relationship between said text and said raster image, such that a location of said text within said raster image is specified. Also more preferably, the system further comprises a polygon sent from the client Web browser to the IC Server, said polygon specifying a portion of the stored information to be sent to the client Web browser, such that said SIF file includes a raster image of said portion of the stored information and such that substantially only said portion of the stored information is displayed by the client Web browser. Most preferably, the IC Server further includes an IC View Server for enabling a display of an image from the stored information on the client Web browser. Also most preferably, the IC Server further includes an IC Print Server for enabling printing of the stored information. Most preferably, the image processor, said IC View Server and said IC Print Server all include at least one Cartridge.

According to another embodiment of the present invention, there is provided a method for managing information, comprising the steps of: (a) capturing the information in an electronic format; (b) converting said captured information into an information component, said information component featuring: (i) a pointer to a storage location of said captured information; (ii) at least one method for manipulating said captured information; and (iii) at least one property of said captured information; (c) storing said information component; and (d) displaying said information component such that said captured information appears in substantially the original format.

According to yet another embodiment of the present invention, there is provided a information component being characterized by being a software object, said software object including: (a) a pointer to a storage location of said stored original information; (b) at least one method for manipulating said stored original information; and (c) at least one property of said stored original information. Preferably, the software object belongs to an information class, said information class belonging to a hierarchy of related classes, such that said information class has a pool of attributes according to a location in said hierarchy. More preferably, the hierarchy includes said information class and at least one information sub-class, such that said pool of attributes of said information class is inherited by said at least one information sub-class. Most preferably, the information class is selected from the group consisting of newspaper class and video stream class. Also most preferably, the newspaper class includes at least one information subclass selected from the group consisting of article, page and picture. Also most preferably, the video stream class includes at least one information subclass selected from the group consisting of video clip and video frame.

According to still another embodiment of the present invention, there is provided a IC Publisher for publishing information, comprising: (a) an IC Capture for capturing the information from an original information source, said original information being captured through an invocation of a software driver for interacting with a software system, said software system being able to access said original information from said original information source; (b) an IC Transformer for storing said original information so that said original information becomes stored original information in a storage location, and converting said stored original information into a metafile; and (c) an IC Transmitter for publishing said metafile. Preferably, the original information source is selected from the group consisting of word processing document, a PDF file, a video stream, an audio stream and a Web page. More preferably, the software system is selected from the group consisting of word processor, facsimile machine software, Web browser and Adobe™ Acrobat™. Most preferably, the software system is said word processor and said software driver is a printer driver. Also more preferably, the metafile includes a raster image of said original information, a pointer to said storage location of said original information, a text of said original information and at least a portion of coordinates of said text within said original information. Most preferably, the metafile is an archive file. Also most preferably, the IC Transformer converts said stored original information according to a process selected from the group consisting of optical character recognition and PDF conversion. Preferably, the IC Transmitter publishes said metafile according to a process selected from the group consisting of transmittal to an object request broker and transmittal to an HTTP daemon.

According to yet another embodiment of the present invention, there is provided an IC Broker for preparing an information component from a metafile containing information, said IC Broker comprising: (a) a content analyzer for obtaining the information from the metafile; (b) a component identifier for identifying at least one element of the information, said at least one element being selected from the group consisting of text and picture; (c) a component classifier for classifying said at least one element according to a knowledge base; and (d) a component generator for generating the information component as a software object, said software object including: (i) a pointer to a storage location of the information; (ii) at least one method for manipulating the information; and (iii) at least one property of the information. Preferably, the software object is selected from the group consisting of Java Bean object and COM object. More preferably, the at least one property is selected from the group consisting of object mapping structure, profile, object image, and access control data. Most preferably, the object mapping structure includes a structure of said software object, a text of said software object and a picture of said software object, said structure relating said text to said picture such that a visual image of the information is reproducible. Also most preferably, the object image is a visual image of the information. Also most preferably, the access control data determines access to said software object. Preferably, the IC Broker further includes an IC Manager for storing and retrieving said information component. More preferably, the IC Manager includes a plurality of CORBA-compliant software objects. Most preferably, the software objects are Cartridges.

According to still another embodiment of the present invention, there is provided an IC Server for serving stored information to a client Web browser, said IC Server comprising: (a) a database for storing the stored information; and (b) an image processor for accessing the stored information from said database and transforming the stored information into a Searchable Image Format (SIF) file, said SIF file being accessible by the client Web browser, such that the stored information is displayable by the client Web browser.

Hereinafter, the term "computing platform" refers to a particular computer hardware system or to a particular software operating system. Examples of such hardware systems include, but are not limited to, personal computers (PC), Mackintosh™ computers, mainframes, minicomputers and workstations. Examples of such software operating systems include, but are not limited to, UNIX, VMS, Linux, MacOS™, DOS, one of the Windows™ operating systems by Microsoft Inc. (Seattle, Wash., USA), including Windows NT™, Windows 3.x™ (in which "x" is a version number, such as "Windows 3.1™") and Windows95™. Hereinafter, the term "software object" includes any software application capable of substantially independent execution by an operating system.

BRIEF DESCRIPTION OF THE DRAWINGS

The invention is herein described, by way of example only, with reference to the accompanying drawings, wherein.

GENERAL DESCRIPTION OF THE INVENTION

Figure 1:
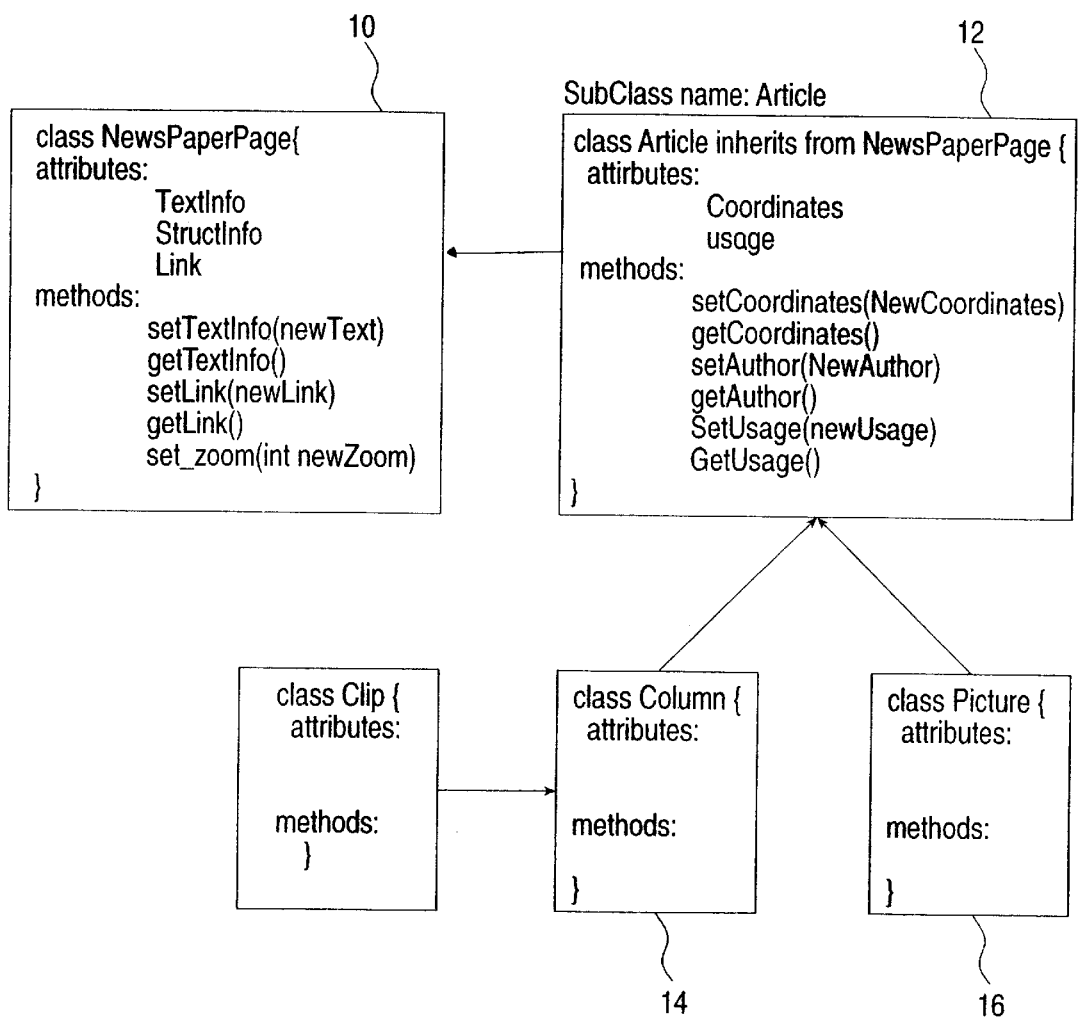
FIG. 1 is a diagram of an information class.

The information component management system of the present invention enables documents, images and other types of information to be packaged within an active information component object, which can then be stored, retrieved and manipulated according to content rather than according to form. The information component includes concepts or ideas, data and structure as separate but related entities. Information components are linked to each other according to a particular relationship, which may be either parallel or hierarchical.

For example, an image of a face of a person is an information component which may in turn be a portion of a larger object, such as a group photo, which may in turn be a portion of an article. The image of the face, the group photo and the article are all individual information components which are linked according to a hierarchical structure. Each information component inherits the features of all associated information components which are higher in the hierarchical structure, and in turn contributes to the pool of features characterizing associated information components which are lower in the hierarchical structure. Thus, information components have both content related to the actual stored information, and content related to the features of associated, higher level components.

The actual stored information from an information component is displayed in substantially the same format as the original source format, so as to maintain the original appearance as much as possible. The displayed information maintains substantially the same fonts, graphics and structure, so that a newspaper page is displayed as a substantially exact reproduction of the page as it originally appeared in newsprint, for example. Thus, the system of the present invention has a clear advantage over prior art document management systems, which usually display retrieved information only as pure ASCII text. Even if graphic images are also displayed, the structure of the entire document, and the visual relationship between the text and the images, is not maintained by these prior art systems.

The information component management system of the present invention is able to search for, and retrieve, information based upon all characteristics of the information component, including graphic images, text and structural relationships. Results are presented as intuitive, visually explicit objects which are easy to examine, manipulate and navigate through. Furthermore, the search results are presented according to the ranked relevance to the desired search strategy, in which the rank is determined with both the full content and the complete characteristics of the information component.

Thus, the system of the present invention includes two basic principles: object oriented management and visual information retrieval. Both principles will be explained in greater detail below, in the Description of the Preferred Embodiments. Briefly, the information components are managed as objects which belong to an information class. Different information classes are linked according to the logical relationship between the components in each class. Overall, the classes are placed within a hierarchical structure, in which each child class inherits the properties of the parent class. Each information class defines the properties and operations of a set of information component.

As noted previously, each information component is a representation of information, combining structured and non-structured data. As an object, the information component also features methods for accessing and manipulating the information, including the data interface and any data operations. Because the methods of the information component are exposed to the general computational environment, the component either can be displayed, or can display itself, on any type of computing platform or operating system. Thus, the information component is both compatible across different computing platforms and has an open, easily accessible interface.

In order to prepare such an information component, several procedures must be performed. First, the information must be identified. Next, the information must be classified and the actual information component must be created. The relationship between the new information component and other information component(s) must be identified. Finally, the behavior of the completed information component is determined according to the functionality of the attributes or features which accrue to that component after classification and identification of relationships.

Once prepared, the information component can be searched and retrieved through visual information search and retrieval. Briefly, the search can be performed according to keyword, visual example and graphic attributes. Visual examples include images or graphic objects which are compared to graphic information stored in the database, just as a keyword search involves the comparison of keywords to text stored in the database. Graphic attributes include font size, font attribute and relative positioning of information within a document. These attributes can also be used as search parameters. Thus, the search is not limited to a simple keyword comparison of stored textual information.

Information which is retrieved as a result of the search is then presented in a substantially similar or even identical format as the original source format. Furthermore, the relevance ranking of the retrieved information is determined both by the number and density of required keywords which appear in the information component, if any, but also is preferably calculated according to the desired visual attributes and relationships to other information components. Even more preferably, as described in more detail below, the system of the present invention includes a mechanism for learning the preferences and profile of an individual user, which can then also be used to calculate the relevance ranking of the retrieved information.

DESCRIPTION OF THE PREFERRED EMBODIMENTS

The present invention is of an information component management system, in which information is packaged as an information component, including textual data, images and structure. Information components are related to each other according to a hierarchical organization, in which characteristics of components which are higher in the hierarchy accrue to those components which are lower in the hierarchy. The information components can be searched and retrieved according to all attributes of the actual information, as well as the characteristics of the component and relationships between components. Thus, the information component management system of the present invention is not limited to simple storage, searches and retrieval of textual data only, but instead preserves all aspects of the original source of information.

The principles and operation of the information component system according to the present invention may be better understood with reference to the drawings and the accompanying description. It should be noted that the following description will make reference to the Java computer programming language and to related software architecture, it being understood that this is for the sake of clarity only and is not meant to be limiting in any way.

The detailed description of the system of the present invention will be divided into six sections. The first section will describe various background art technologies which are the preferred support technologies for the system of the present invention. These technologies are described as "background art" because they are not fulfilling the same functions as the system of the present invention, but instead are merely enabling these functions. The next section will provide a description of information component architecture according to preferred embodiments of the present invention. The third section will provide a brief overall view of the entire system according to the present invention. The final four sections will describe preferred embodiments of the four main elements of the management system of the present invention: information component publisher, information component broker, information component server and information component interface.

Section 1: Background Art Technologies

The background art technologies which described in this section are well known in the art. The description provided herein is not intended to be exhaustive, but rather to teach those aspects of the background art technologies which are required to support the management system of the present invention. Thus, one of ordinary skill in the art could easily use these background technologies in combination with the teachings of the present invention, without requiring undue experimentation.

The preferred background art technologies which are described herein include CORBA, a particular proprietary embodiment of CORBA, and the Java Bean component architecture.

Preferably, both the information components of the present invention and the management system for these components are compliant with the CORBA (Common Object Request Broker Architecture) standard, which is a standard for communication between distributed objects established by OMG (Object Management Group). OMG is a consortium of over 700 different software developers. Thus, standards developed by OMG are industry-wide and software applications compliant with these standards should be able to successfully interact with other compliant applications, as described below.

CORBA is a standard which provides a standard method for execution of program modules in a distributed environment, regardless of the computer programming language in which the modules are written, or the computing platform on which they are executed. CORBA enables complex systems to built, integrating many different types of computing platforms within an entire business, for example.

In order to permit different software applications to communicate, regardless of programming language, hardware or operating system, all such applications communicate through a CORBA-compliant ORB (Object Request Broker). Each application is an "object" with a particular interface through which communication is enabled. ORB acts as the "middle-man", passing information and requests for service to each object as necessary. Thus, one software application does not need to understand or know the interface used by another object, since all communication occurs through ORB.

Furthermore, the use of an ORB permits true distributed computing, since different objects do not need to be operated by the same computer or even reside on the same network. The ORB directs any communication to the appropriate server which contains the object, which might be located on the same host, or a different host, as the client object. The ORB then redirects the results back to the client object. Thus, CORBA can also be described as an "object bus" because it is a communications interface through which objects are located and accessed.

In addition, CORBA provides IIOP (Internet Inter-ORB Protocol), which is the CORBA message protocol for communication on the Internet. IIOP links GIOP (CORBA's General Inter-ORB Protocol) to TCP/IP, the general communication protocol of the Internet. GIOP in turn specifies how one ORB communicates with another ORB. These two types of protocols were implemented to enable different proprietary ORB implementations to communicate over the Internet. Therefore, one type of proprietary ORB can communicate with another, different type of proprietary ORB on a different host computer according to a combination of IIOP and GIOP protocols. Practically speaking, if IIOP is built into a Web browser such as Netscape™ Navigator™, a Java applet is downloaded into the Web browser when the user accesses a Web page with a CORBA object. The Java applet invokes the ORB to first pass data to the object, then to execute the object and finally retrieve the results. Thus, in combination all of these protocols define a set of expected behaviors which all components of CORBA—objects and ORB—must fulfill.

Further information on both CORBA and IIOP can be obtained from the "TechWeb Technology Encyclopedia" (http://www.tech-web.com/encyclopedia as of Sep. 10, 1997).

One proprietary version of the CORBA technology for enabling distributed web-based applications is called the Web Request Broker (WRB), developed by Oracle Corp. (Redwood Shores, Calif., USA). WRB is described in a white paper (M. Anand et al., "The Web Request Broker: a Framework for Distributed Web-based Applications", http://www.olab.com/www6_1/paper.html as of Sep. 10, 1997). Briefly, the WRB architecture includes the dispatcher, application and system cartridges, and a CORBA compliant ORB. The dispatcher and cartridges use the ORB for communication between components, so that these components can be distributed on separate remote machines. The dispatcher routes requests from the HTTP daemon to the appropriate cartridge. The cartridges are software components which perform a specific function and are thus the "objects" described previously.

Cartridges are used within the system of the present invention as an exemplary support for a number of different functions, as described in subsequent sections. Cartridges have a name, composed of the IP address of the server where the cartridge is located, and the virtual path to the location of the cartridge on that server. Cartridges also have a standard interface, which includes a number of methods. Examples of such methods include the authenticate routine, which determines whether the client is entitled to requested services and the exec routine, which receives the particular service request if the authentication routine is successfully performed. Thus, the cartridge technology provides a fully developed basis for the creation of particular software functionality.

One particular advantage of employing the proprietary cartridge technology for software development is that the system architecture provides a framework for interaction between different objects over the Internet by using HTTP Web servers and existing Web browsers. The CORBA protocols only define a standard, but do not provide any specific implementation. Thus, the proprietary cartridge technology enables one of ordinary skill in the art to develop a software application which can communicate with other applications over the World Wide Web.

Another type of enabling background art technology is "Java Bean". Java Bean is a component software architecture which operates in the Java programming environment. Java, of course, is an interpreter-driven, object-oriented computer programming language which is substantially platform-independent. Software packages which are written in Java can be operated by any operating system, or platform, which supports the Java interpreter. Similarly, a Java Bean component can run remotely and independently as a discrete software application object in a distributed computing environment using either the Remote Method Invocation protocol of Sun Computers Inc., or else by using CORBA. As described below, information components are preferably packaged and then distributed as independent Java Bean components.

The Java Bean component software architecture is a set of API's (Application Programming Interfaces) and rules which enable software developers to define software components to be dynamically combined to create a software application. The Java Bean component model has two major elements: components and containers.

Components range in size and capability from small GUI (graphic user interface) widgets such as a button, to an applet-sized functionality such as a tabular viewer, and even to a full-sized application such as an HTML (HyperText Mark-up Language) viewer or the information component of the present invention. Components can have a visual aspect, such as a button, can actually be visual information or can be non-visual, such as a data-based monitoring component.

Containers hold an assembly of related components. Containers provide the context for components to be arranged and interact with each other. Containers are occasionally referred to as "forms", "pages", "frames" or "shells". Containers can also be components, so that a container can be used as a component inside another container.

The Java Bean component model provides the following major types of services: component interface exposure and discovery; component properties; event handling; persistence; application builder support and component packaging. Component interface exposure and discovery allows components to expose their interface so that they can be driven dynamically by calls and event notifications from other components or application scripts. Component properties are the public attributes of a component which either directly reflect or effect the current state of that component. For example, properties could include the "foreground color" of a video clip, its zoom factor or its access rights. The state of these properties can be interrogated or modified through standard mechanisms.

Event handling is the mechanism for components to "raise" or "broadcast" events and have those events delivered to the appropriate component or components which need to be notified. Typically, notified components then perform a particular function in response. For example, if he user interface shows a document image clip on the monitor screen, the parent Information Object event will communicate with the Object Server to transmit the full page of the clip, and will send a viewing command to the full-page viewer component. Thus, event handling allows information components to interact with each other.

Persistence is the mechanism for storing the state of a component in a non-volatile location. The component state is stored in the context of the container and in relation to other components. For example, if the user wants to save the viewing zoom factor for all of the following documents, the persistence mechanism would support this.

Application builder support interfaces enable components to expose their properties and behaviors to application builder development tools. Using these interfaces, the tools can determine the properties and behaviors, or events and methods, of arbitrary components. The tools can provide mechanisms such as tool palettes, inspectors and editors, which the application developer uses to assemble an application. Through these mechanisms, the application developer can modify the state and appearance of components as well as establish relationships between components.

This mechanism enables sophisticated information applications such as Hypertext links to be created. For example, using an appropriate multimedia tool, the user can define a button which appears on the viewed document, and then links the document to a different document. The application developer will use property editors to specify the appearance, including size, color and label, of the button, the link type and the link target.

Since Java Bean components can be distributed and independently deployed over a network, there is a need to provide a facility to physically "package" the resources which are included in an information component so that they are accessible to the other Java Bean components. Preferably, such packaging is performed with the JAR (Java Archive) file format. The JAR file format enables the class file of the information component and other information component resources such as images, OMS (object mapping structure), sounds, and link information, to be packaged as a single physical entity for distribution.

Section 2: Information Component Architecture

As noted previously, each information component has a number of different elements and properties. Each information component belongs to an information class. The information class defines the properties and operations of a group of information components. Information classes can describe a newspaper, a general document or a video clip, for example.

Referring now to the drawings, FIG. 1 is an exemplary illustration of an information class for a newspaper page. An information class 10 defines the properties and operations of components which contain newspaper pages. These properties include textual information, structural information and any links to other components. The operations, or methods, include retrieving the textual information, for example. Thus, the operations are used to store, retrieve or modify information contained in the properties.

Information class 10 has a sub-class 12 for an individual newspaper article. Sub-class 12 inherits the properties of the parent class, information class 10. In addition, sub-class 12 may have additional properties and methods, such as the coordinates of the location of the article within the newspaper page, or an operation for retrieving the name of the author of the article. Other information classes 14 and 16 are also shown for columns and pictures respectively. For example, information class 16 might have information about pictures which are associated with the article. Information class 14 might contain information about the structure of the column which contains the article. In any case, these additional information classes 14 and 16 are related to information sub-class 12 according to a defined set of relationships.

Figure 2:
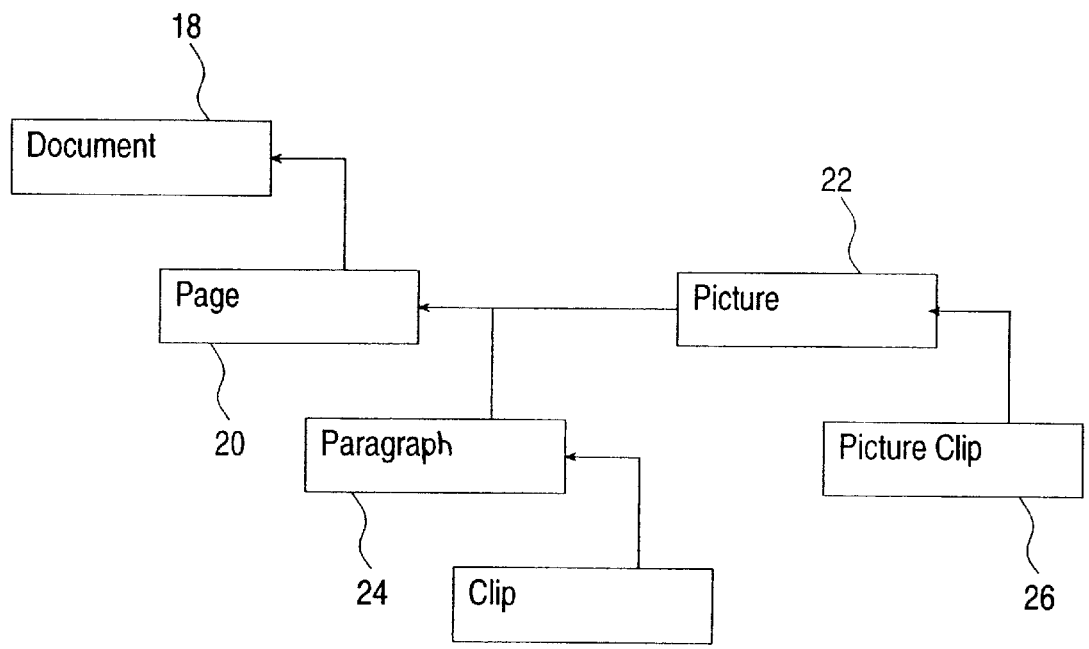
FIG. 2 shows a document information class.

FIG. 2 shows an exemplary general document information class. A document information class 18 has two sub-classes, a picture sub-class 22 and a page sub-class 20. Page sub-class 20, in turn, has a paragraph sub-class 24, while picture sub-class 22 has a picture clip sub-class 26, which might contain the actual image. Additional sub-classes might also be possible. Thus, substantially any document could be broken down into information components of class 18, and sub-classes 20, 22, 24 and 26.

Figure 3:
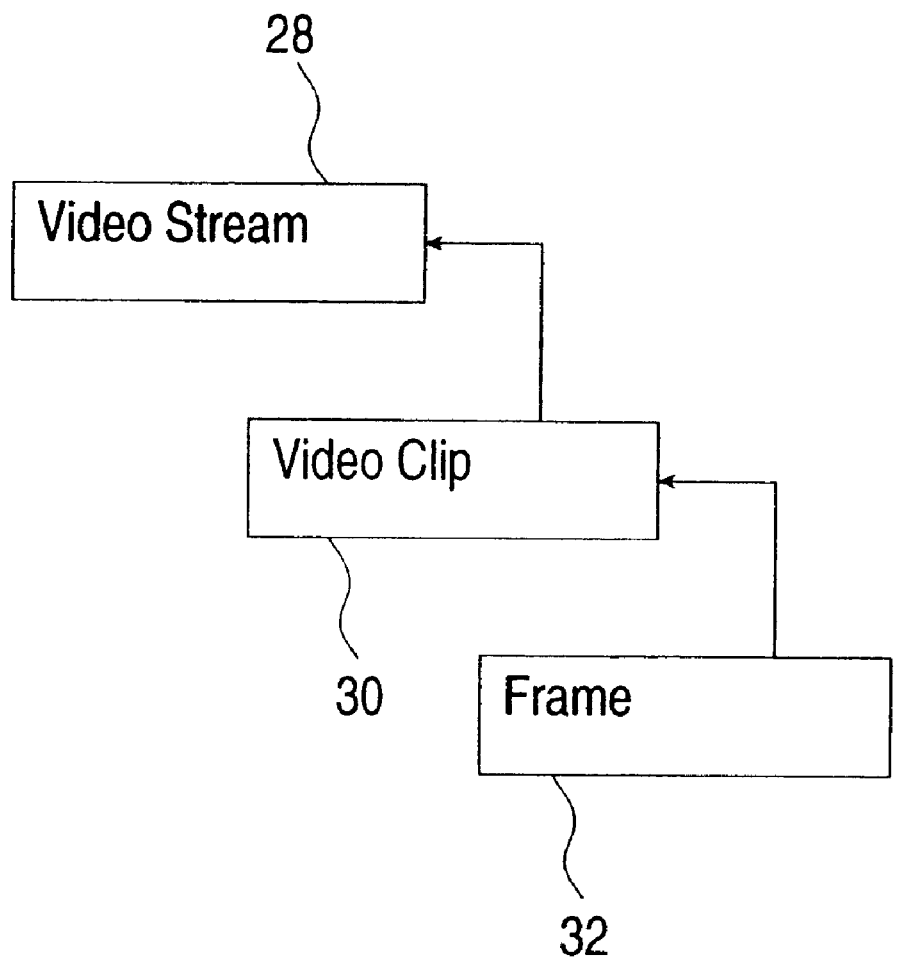
FIG. 3 is a diagram of the video clip information class.

FIG. 3 shows an exemplary video clip information class, which contains information such as data and structure for a segment of recorded video. A video stream information class 28 is the general, overall class for the hierarchy. A video clip information sub-class 30 is lower down, followed by a frame sub-class 32. Frame sub-class 32 might contain only information regarding a single frame of the video. Thus, even though a video may be considered as a sequential collection of images which give the illusion of movement, it too can be broken down into smaller elements which are then stored in the above-mentioned information classes and sub-classes.

Section 3: General System Architecture

This section provides an overview of the general architecture of the management system of the present invention, as well as of the interactions between the four main elements of this system. The specific functions of each element will also be described in successive sections below.

Figure 4:
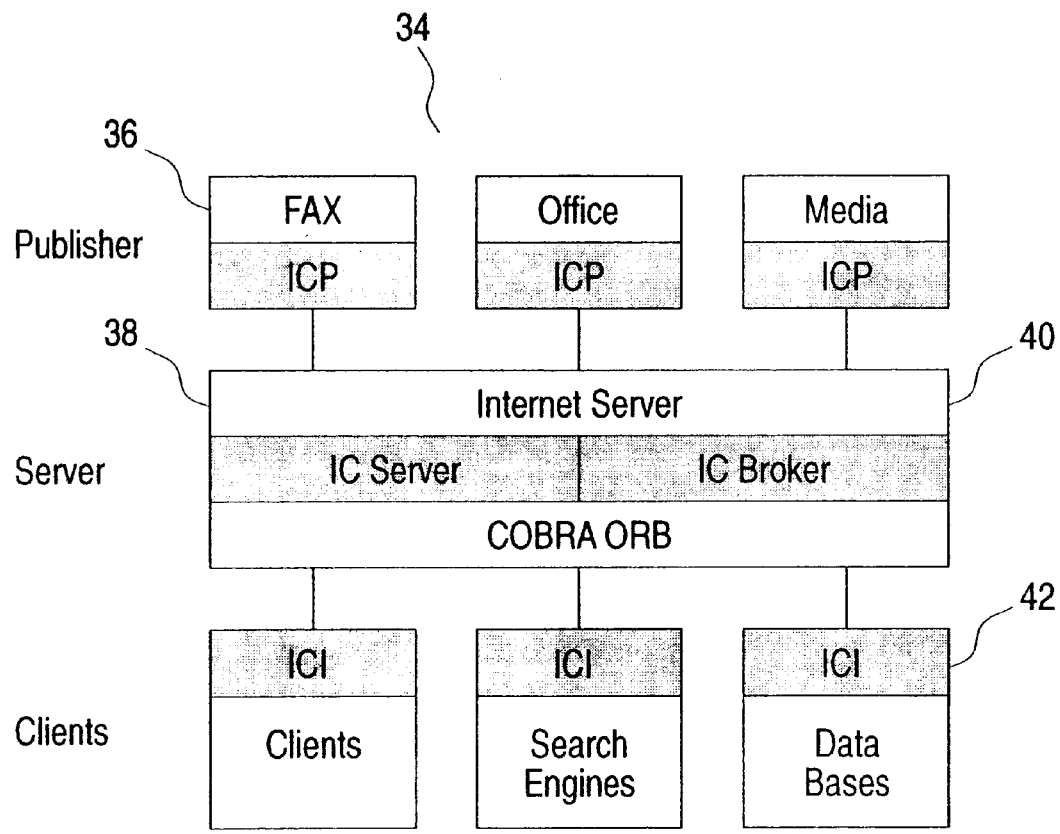
FIG. 4 is a diagram of the general architecture of the system of the present invention.

FIG. 4 shows the general architecture of the system of the present invention. A general system architecture 34 includes IC (Information Component) Publisher 36, IC Server 38, IC Broker 40 and IC Interface 42. Although each element will be described in further detail below, briefly IC Publisher 36 is responsible for the acquisition and conversion of information content, and for the transmission of the converted information content to IC Server 38. IC Server 38 then stores the actual or "original" information such as documents, multimedia objects and other types of information entities. IC Broker 40 performs two tasks: creating new, lower level information components from a main, higher level information component; and then storing these information components in a database. IC Interface 42 enables a variety of client applications, described below, to access these stored information components. Thus, the general system of the present invention collects the information from a variety of sources, packages the information into information components, and then stores the components for later retrieval by a client application.

Section 4: Information Component Publisher

Figure 5:
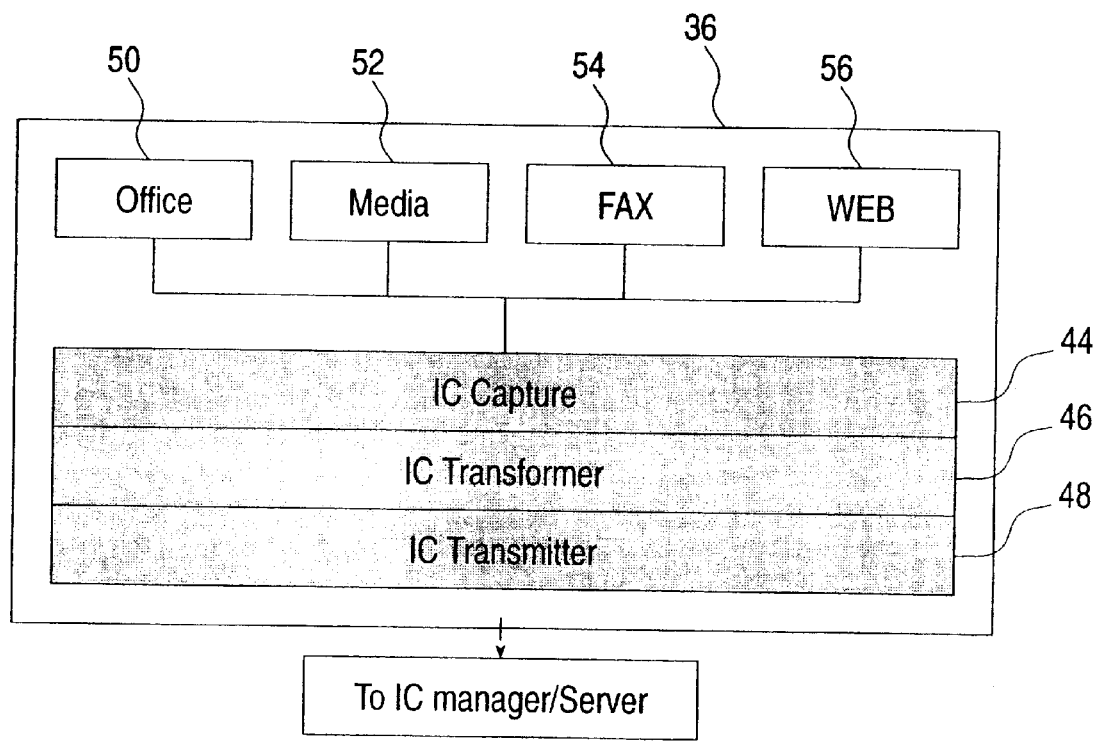
FIG. 5 is a diagram of a preferred embodiment of the IC Publisher of the present invention.

This section describes the IC (information component) Publisher, which is shown within the larger context of the entire system in FIG. 4, and is also shown in more detail in FIG. 5.

IC Publisher 36 has three parts: IC Capture 44, IC Transformer 46 and IC Transmitter 48. IC Capture 44 preferably operates as memory resident software and captures the desired information content from a variety of software systems including, but not limited to, a document editor 50 such as the Word product of Microsoft; a media application 52 such as PDF files from Adobe™ Acrobat™; facsimile machine software 54 for operating a facsimile machine; and a Web browser software 56 such as Netscape™ Navigator™. Additional software systems from which information content can be captured include imaging software and spreadsheet software. These software systems are intended as illustrative examples only, since substantially any software system which handles, stores, retrieves or manipulates information could have that information captured by IC Capture 44.

IC Capture 44 invokes the appropriate software drivers for handling different information formats from the above software systems. As an example, information could be captured from a document stored in the format of Microsoft™ Word™ word processing software. A number of possible methods could be used to capture the information contained within the document, two illustrative examples of which are given here, it being understood that these are for discussion purposes only and are not meant to be limiting.

In the first exemplary implementation, IC Capture 44 interacts with Microsoft™ Word™ and instructs Microsoft™ Word™ to place the document on the "clipboard". The "clipboard" is a feature of a number of different computer operating systems, in particular those operating systems of Microsoft Inc. (Seattle, Wash., USA), such as "Windows95™" and "Windows NT™", for example. The general function of the "clipboard" is to enable one software application, such as Microsoft™ Word™, to make information available to another software application, such as IC Capture 44. Hereinafter, the term "clipboard" refers to any feature of a computer operating system which enables information to be exchanged between two software applications. Once the document has been copied to, or placed on, the clipboard, the document is then pasted to IC Capture 44.

In the second exemplary implementation, IC Capture 44 captures the necessary information about the document through substantially direct interaction with the software system, such as Microsoft™ Word™. Such interaction can be performed according to a number of different methods. For example, Microsoft™ Word™ enables other software applications to obtain this information through the creation of a "macro". Alternatively, IC Capture 44 could include a printer driver, which would enable Microsoft™ Word™ to "print" the document to IC Capture 44 directly, or alternatively to a file in a format accessible by IC Capture 44. In any case, regardless of the specific method employed, the captured information is then sent to IC Transformer 46.

IC Transformer 46 converts the original, captured information and then packages it into a metafile, preferably in the format of an archive file prepared according to a process such as the "ZIP" archival method. This metafile preferably includes a raster image of the document, a pointer to the storage location of the original document, any text contained within the document and the coordinates of the words of the text within the document. More specifically, the coordinates preferably include all information which is necessary to geographically locate the word within the document, such as the number of the page on which the word falls, the number of the word on the page and the coordinates of the rectangle which bounds the word on the page, or "bounding rectangle". The bounding rectangle determines the area occupied by the word on a page and is necessary to fully reproduce the visual aspects of that word. Thus, the coordinates of each word numerically describe the visual appearance of the word.

As an example of this process of obtaining text and coordinates, if the source of information is a paper document which has been scanned to an electronic file, IC Transformer 46 performs OCR (Optical Character Recognition) to obtain the textual information from the image stored in the electronic file by converting the image of a letter into the letter itself. Both the text itself and the coordinates of individual words are then available to IC Transformer 46 to be packed into the metafile. Other examples of such processes include pattern recognition and PDF conversion. It should be noted that these processes are already well known in the art for the creation and manipulation of information in a particular information source format.

After IC Transformer 46 has completed the preparation of the metafile, the metafile is given to IC Transmitter 48. IC Transmitter 48 is preferably an ORB (Object Request Broker) which is able to communicate with other ORB's according to the CORBA protocol. IC Transmitter 48 forwards the metafile to IC Broker 40, preferably by using the IIOP communication protocol of CORBA to communicate with IC Broker 40, as described in the next section. Preferably, IC Broker 40 includes a CORBA-compliant ORB, thus enabling communication according to IIOP. However, substantially any communication protocol could be used which is implemented by, and accessible to, both IC Transmitter 48 and IC Broker 40.

Section 5: Information Component Broker

IC Broker 40 has two tasks. First, IC Broker 40 automatically identifies and creates information components from the information metafile passed from IC Transmitter 48, as described in the previous section. Second, IC Broker 40 stores the information components in a database. As an example of the first task, the main theme or themes of the document information contained in the information metafile can be placed within an information component. This main information component can then be divided into sub-components such as paragraphs, pictures and so forth. Each sub-component is a lower level information component, which is classified, analyzed and actually transformed into an independent, individual information component.

However, this new information component will still maintain the appropriate relationships to all other information components derived from the main component. Furthermore, the stored information components can be located and retrieved from a database according to both the actual data and the various interrelationships.

Figure 6:
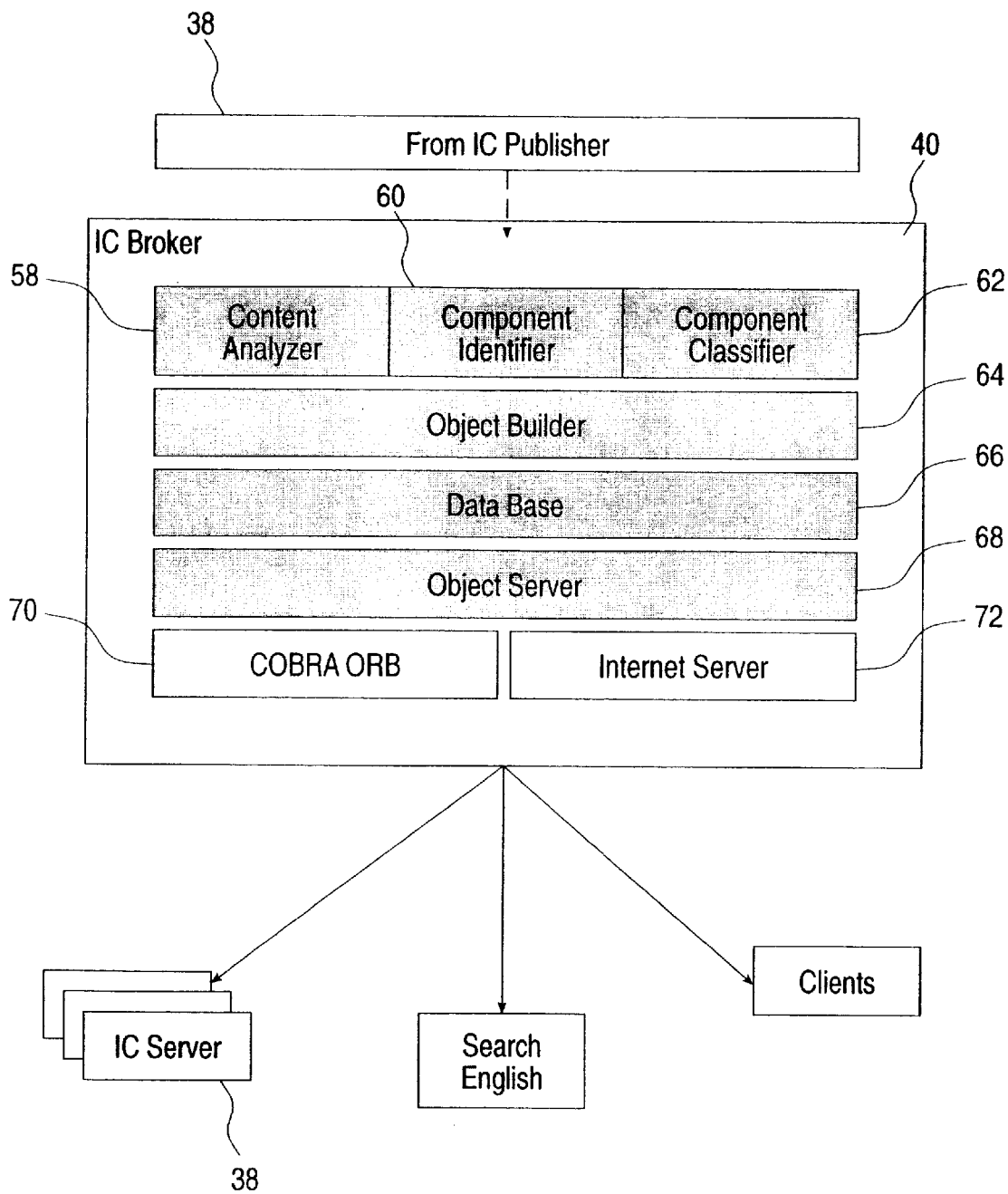
FIG. 6 is a diagram of a preferred embodiment of the IC Broker of the present invention.

FIG. 6 shows IC Broker 40 in more detail. The first layer of IC Broker 40 includes a content analyzer 58, a component identifier 60 and a component classifier 62. Content analyzer 58 obtains the content of the information from the metafile by using a particular software driver. Each software driver is relevant to the particular information source format, such as electronically scanned paper document, electronic document such as a word processing document, video clip, document sent by facsimile and other such formats. Each driver is a channel to an information processing unit for a specific type of information, and invokes a process specific to the source of that information. Finally, the content information is stored in an internal unified format for data processing and information component recognition, access and retrieval.

After the content of the information has been analyzed by content analyzer 58, the information is passed to component identifier 60. Component identifier 60 examines the received information at two levels. First, the textual information is identified and separated into individual elements, according to the structure of the type of information. The second level of examination of the received information is visual identification, which includes determining the visual attributes and structure of the information. At the end of this dual level examination, the main information component has been subdivided into individual information components, each of which represents a specific idea or concept within the entire unit of information.

An illustrative example of this process is disclosed in U.S. application Ser. No. 08/318,044, herein incorporated by reference. The disclosed process includes the following steps. First, the document is converted into a digital raster format, for example by scanning a paper document, which is stored in an electronic file. This step is preferably performed by IC Transformer 46. Next, preferably the converted document is enhanced to improve the quality of the image, for example. In the third step, the enhanced raster format file is converted into two electronic files, collectively called a "binary/raster file". The first file has the enhanced raster format, while the second file has pointers to the enhanced raster format file. Every data element in the raster format file, such as textual information or an entire graphic image, could have a corresponding pointer in the second file. Thus, the two files are preferably produced, at least in part, by an automatic text recognition process such as OCR, which enables the image of the text to be realized as textual data.

Next, all of the binary/raster files are divided into three secondary databases: a geometrical database, a textual database and an administrative database. The geometrical database includes the exact geometrical position of all special interest elements within the binary/raster files, such as pictures or individual words. The textual database contains all of the actual text from a document. Finally, the administrative database contains such administrative information as the format of the original document, dates, user authorization and so forth.

Once all of the data has been placed in a database, indices for information retrieval are created. Each database has its own set of indices for fast random access of data. An index for the textual database might include keywords, for example. Thus, the original document has been subdivided and stored as a collection of information elements or components.

After the individual components have been prepared, each individual information component is classified according to a pre-existing knowledge base by component classifier 62. The individual component is compared to components listed within the knowledge base, and is recognized as a unique and individual element belonging to a larger information cluster. Each component is classified first by assignment to a primary information class, and then by placement within the hierarchical structure of information sub-classes belonging to that primary class.

For example, if the information is an article from a newspaper, the primary information class would be the class for the newspaper page itself. Sub-classes would include the sub-class for various articles within the page, and another sub-class for any pictures on the page, as well as any other further sub-class divisions into which the information class "newspaper page" can be divided. In this case, the article component would be placed in the primary information class "newspaper page" and the sub-class "article". As another example, suppose that the information component was a "Sales Figures" table appearing within a newsletter. The component would be linked to the paragraph in which the table appears, which in turn would be linked to the page in which the paragraph appears, and which in turn would be linked to that particular volume of the newsletter itself. Each of these links represents another step up the hierarchy of classes, from the sub-class "table" to the primary class "newsletter". This entire hierarchical class structure would already have been placed into the pre-existing knowledge base.

Within the knowledge base, each such class structure is preferably included within an Information Class Library. This Library contains pre-defined knowledge and understanding of the different types of components supported by each information class structure, so that information components can be classified and assigned to a particular information class, as described above.

Once the information component has been fully classified, it is passed to the next layer of IC Broker 40, which is a component generator 64. Component generator 64 transforms the classified information component into a standard format including, but not limited to, an active object format such as a COM object or a Java Bean object, or a flat file format. For the purposes of discussion only and without any desire to be limiting, the following description will center upon the transformation of the information component into a Java Bean object having two groups of characteristics: properties and methods.

Properties are descriptive features of the Java Bean object. Such features preferably include the OMS (Object Mapping Structure) which is the text, structure, graphics and APPS intelligence of the Java Bean object. The latter feature, APPS intelligence, is applicable only if the original document was a paper document scanned into an electronic file, since APPS stands for "Adaptive Probability Pattern Search", which enables text to be searched in an image even if not correctly recognized by the OCR process described previously. The OMS contains information related to the overall structure of the Java Bean object, as well as a description of the relationships between different portions of that object.

Preferably, the profile information is also included. The profile information includes any additional desired characteristics of the original document. These characteristics are determined by the user through IC Publisher 36. For example, the profile information could include data concerning the type of company which published the original document Thus, the profile information is external to the original document and is added according to the specification of IC Publisher 36.

Other preferred properties include an optional but preferable object image, which is a visual image of the original document. Another preferred property is hyperlink information, which describes all connections to locations on the World Wide Web. Preferably, a description of the relationships between this component and other components is also provided. Finally preferably security and access control data is provided, which determines who is allowed to access the information.

Methods determine the ways in which the data and properties of the information component can be manipulated. These methods are standard for the Java Bean component architecture. For example, methods include ways to access the data, whether as an image, a video clip, a sound and so forth. Methods also include an application interface, so that another application would be able to interact with the information component and with the stored data, and with a GUI (graphical user interface). Other methods pertain to access control and to event handling. Event handling, as noted previously in section 1, is the mechanism for Java Bean components to broadcast events and to have those events delivered to an appropriate component or components for notification. Thus, event handling provides methods for communication between components packaged as Java Beans.

Although individual methods might be specific to a particular information component, such that a newspaper article component would probably not include a method for manipulating sound, the overall mechanism for describing each method is supported by the Java Bean component architecture and could be easily determined by one of ordinary skill in the art.

The information component is preferably packaged as a Java Bean by using the JAR file format. The JAR file format includes such information as the class file, images, sounds and links to other components. The class file is a description of the information class to which the information component belongs. Each such piece of information is stored in the JAR file format as a pointer to the storage location to the relevant data, such as an image for example. Thus, the JAR file format wraps additional information and data around the information component, in such a way that all of the information and data is both presented as a single, independent entity, yet is readily accessible to other software objects.

Figure 7:
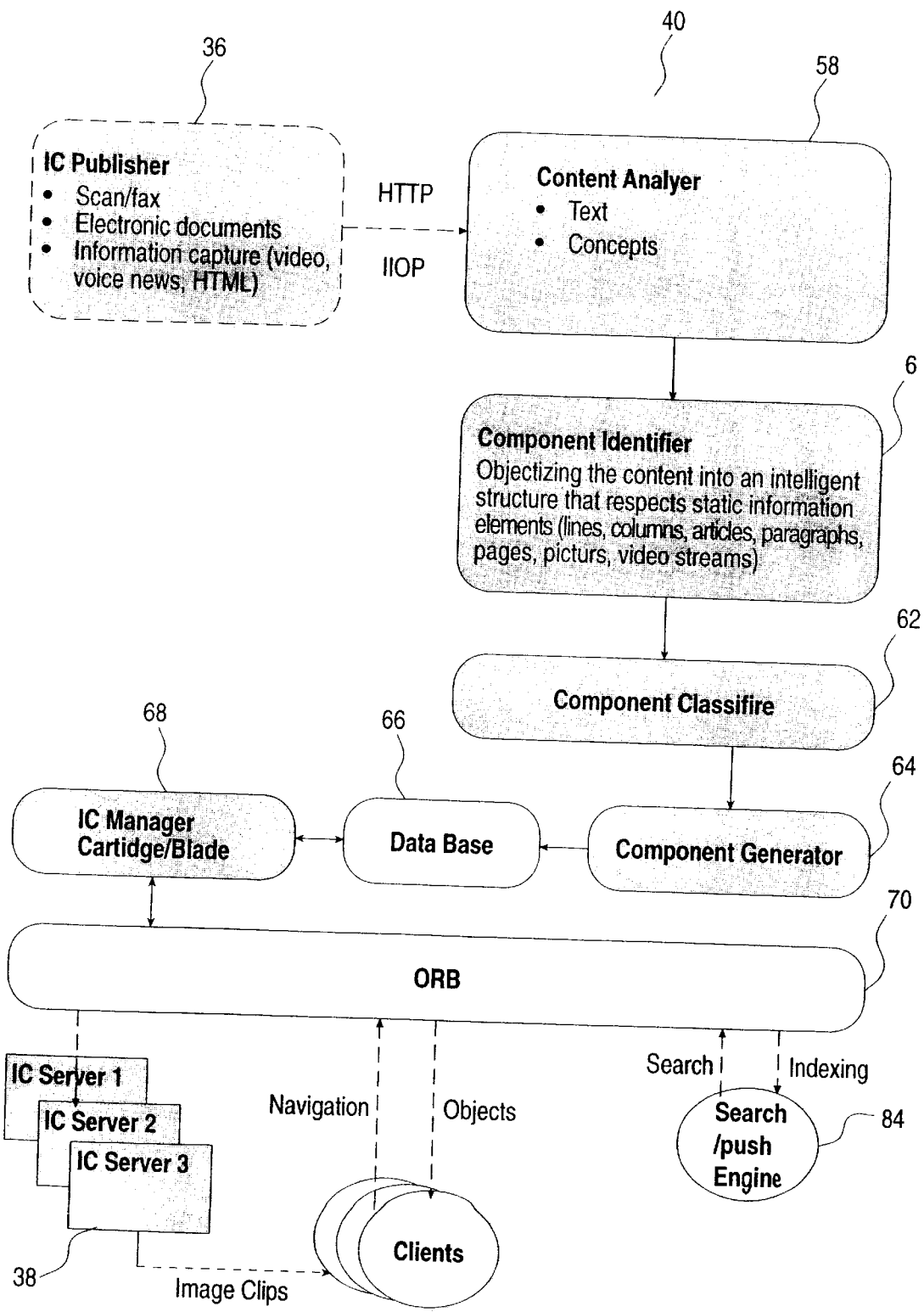
FIG. 7 is a diagram of the data flow in the system of the present invention.

Once the information component has been transformed into an active Java Bean object by component generator 64, the active object is then stored in a database 66. Database 66 is both accessible to, and is managed by, an IC Manager 68, as shown in FIG. 7. IC Manager 68 is responsible for supplying the main CORBA services, as described in Section 1. Preferably, IC Manager 68 provides these services by being adapted to the main proprietary ORB models which are available, such as the "Cartridge" model of Oracle Corp. (California, USA) or the "Blade" model of Informix.

The main CORBA services include database and indexing services for search and retrieval engines, and for push applications; database navigation services, distributed viewing, imaging and printing services for the information components; network control and retrieval services; and distributed storage services for information components.

For example, if IC Manager 68 is adapted to the "Cartridge" model, then components are accessed from database 66 through one of a number of cartridges. Each cartridge is a module of software which performs a specific function. Each of the previously described services performed by IC Manager 68 is provided by a separate cartridge. Different cartridges could provide database indexing, database navigation and information component retrieval services for example, without requiring the cartridge and the database to be on the same server computer. These cartridges would communicate with each other and with any databases through an ORB, described below. One advantage of the "Cartridge" model is that communication between different computers could occur through the World Wide Web, via an HTTP daemon as described in section 1. Cartridges are named with a combination of the IP address of the server where the cartridge is located and the virtual path to the location of the cartridge on that server. Thus, IC Manager 68 would be composed of a number of different cartridges, on one server or a plurality of servers, which preferably interact with each other and any other necessary components, such as databases, through the World Wide Web.

Two additional elements are shown in FIGS. 6 and 7, which are not restricted to IC Broker 40, but are actually shared between IC Broker 40 and IC Server 38 (described in the next section below). These two additional elements are ORB 70 and a preferred Internet server 72. ORB 70 is an Object Request Broker, preferably a WRB, or ORB for the "Cartridge" model which is able to communicate with individual cartridges. Internet server 72 enables ORB 70 to send requests and receive information through the Internet. Together, ORB 70 and Internet server 72 enable specific information components to be retrieved by first activating a particular cartridge and then performing some action through database 66. Thus, the name of a desired cartridge can be given to ORB 70, which then locates and activates the desired cartridge, through the Internet if necessary.

Once the cartridge has been activated, it performs a specific function, such as retrieving an information component from database 66, for example. The information component can then be distributed through Internet server 72, which sends the component to IC Server 38. Of course, any other communication method which enables IC Broker 40 to interact with IC Server 38, and to give the component to IC Server 38, could also be used.

Section 6: IC (Information Component) Server

IC Server 38 stores and manages the "original" information, such as documents, video segments, sounds and so forth. When a client application issues a request for information, IC Server 38 locates the original information entity, isolates the corresponding information component according to a pointer stored in the Java Bean component for example, and then creates an "object image clip". The object image clip is then sent back to the client application as an HTML file. IC Server 38 can act as a local CORBA service on the same hardware as IC Broker 40 or as a remote CORBA object for distributed applications. Thus, IC Server 38 is also preferably composed of a number of different cartridges which perform different functions and which communicate with each other and with IC Broker 40 through an ORB such as ORB 70.

Figure 8:
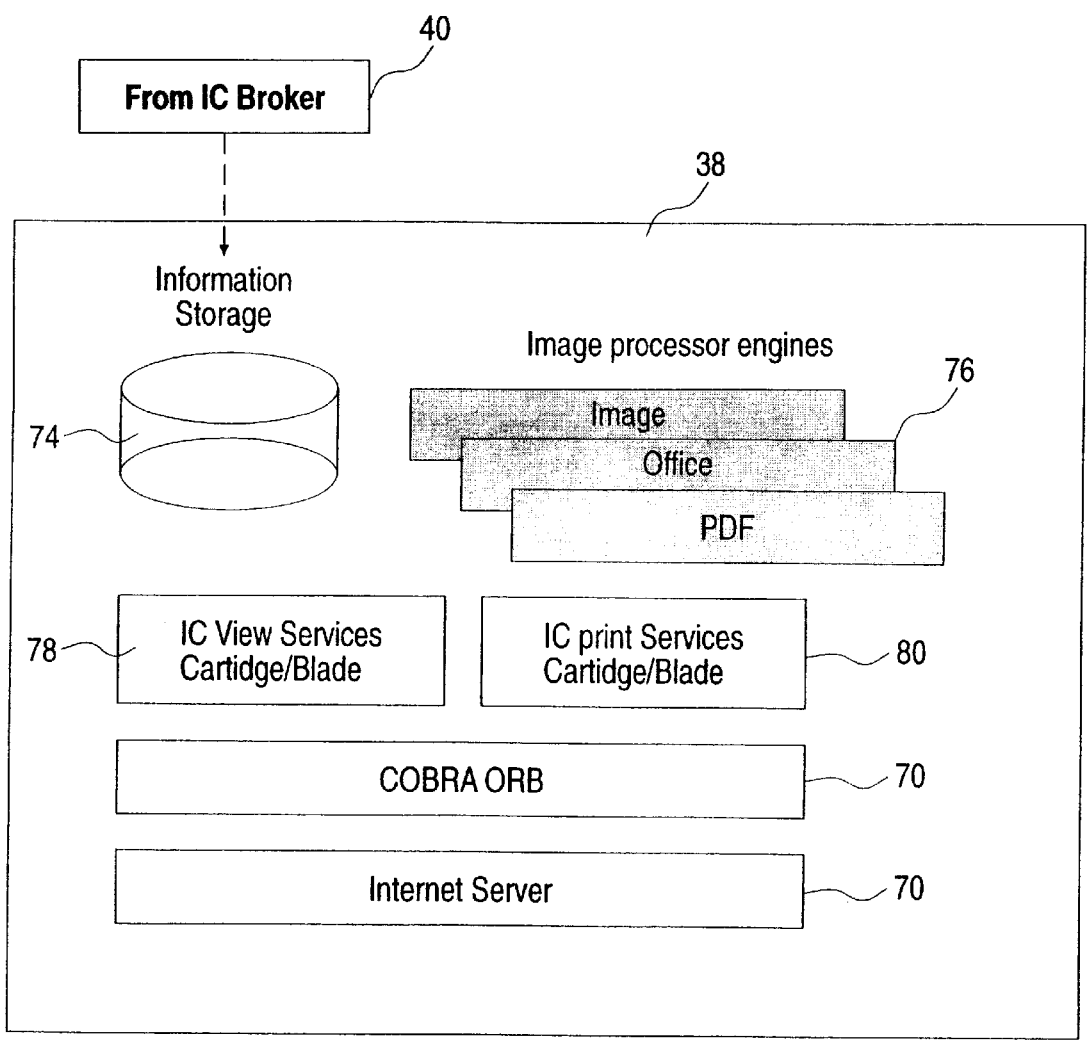
FIG. 8 is a diagram of a preferred embodiment of the IC Server of the present invention.

As shown in FIG. 8, IC Server 38 has a number of elements. First, the "original" information is stored in an information storage 74, which could optionally be identical with database 66, or alternatively a different database. Once the desired original information has been retrieved, it is sent to one of a plurality of image processors 76. Each image processor 76 transforms the original information, such as a document, into a Searchable Image Format (SIF) file. Each SIF file can be searched, transformed into HyperText and manipulated with copy and paste functions. Each information format preferably has its own image processor 76, so that for example a first image processor 76 could manipulate text editor documents, while a second image processor 76 might handle graphics files such as TIF (Tagged Image Format) or GIF (Graphics Interchange Format) format files, for example. Furthermore, each image processor 76 is able to transform the "original" information into the corresponding SIF file "on the fly". Thus, the SIF file can be created and recreated as needed, without the requirement of storing both the SIF file and the "original" information.

One example of how such a SIF file could be created from a paper document is given in U.S. application Ser. No. 08/625,496, herein incorporated by reference in its entirety, it being understood that this is only for illustrative purposes only and is not meant to be limiting. SIF files are preferably actually image files, most preferably fully compatible with the TIF file format, which incorporate both graphic images and information data stored in a separate text file, as well as the structure which relates the graphic and textual information within the original document.

SIF files include a header section for general information about the file such as the image resolution, the digital graphic image stored in the conventional raster format, information relating to individual words or elements of the image file, and administrative information which contains the relational structure of the image and textual elements. The information relating to individual words includes not only the text of the words, but also the data generated by the OCR technology regarding unidentified characters and probable errors (APPS), if the original document was an electronically scanned paper document. Thus, any search of the textual information can compensate for these unidentified characters and errors.

The actual SIF file is assembled from the basic document elements which were described in Sections 2 and 5. The document was partitioned into these elements by component identifier 60, which were then packaged into an information component in subsequent steps of the process. The SIF file is assembled "on the fly" by image processor 76, and can then be distributed to a client through ORB 70 and Internet server 72. Thus, the SIF file would include the text and images from an original document, for example.

According to another preferred embodiment, the client application issues a request for information by sending a polygon to IC Server 38. This polygon would include the geometrical location of the desired information within a document. The polygon could first be obtained as the results of a search through IC Broker 40, for example. Once obtained, the polygon would enable IC Server 38 to determine exactly which information to package into the object image clip. For example, the client application might only want to retrieve a single table from a newsletter. The appropriate polygon would be sent to IC Server 38, which would then pass the request to the appropriate image server 76. The table would then be sent as an object image clip to the client application. Thus, rather than storing the original document as a collection of smaller components, the original document would be stored in its entirety but then retrieved as an individual component or components, if desired.

In preferred embodiments of the present invention, IC Server 38 also includes an IC View Server 78 and an IC Print Server 80. Similarly to IC Manager 68, both IC View Server 78 and IC Print Server 80 may provide these services by being adapted to the main proprietary ORB models which are available, such as the "Cartridge" model of Oracle Corp. (California, USA) or the "Blade" model of Informix. For example, IC Print Server 80 preferably allows high quality on-demand printing of the original document in a platform-independent manner. Each separate printing service is provided as a cartridge if the "Cartridge" model is used.

IC View Server 78 provides the appropriate image application services to ORB 70, such as services related to the display of an image on a computer screen through a GUI, for example. IC View Server 78 could also provide each service as a cartridge if the "Cartridge" model is used.

Section 7: IC (Information Component) Interface

IC Interface 42 provides a user interface (GUI) which enables client applications to interact with the functionality of the information management system of the present invention. In this section, IC Interface 42 will be discussed with regard to a search/push engine 84, as shown in FIG. 7. Search/push engine 84 enables the user to search for information, and organize and view the results in a manner which has intuitive appeal.

The user interface for search/push engine 84 is called the editor's table. The table is actually the display window on the computer monitor screen. Information components are displayed as separate icons on this screen. For example, a newspaper page might be displayed as an icon which included an image of at least a portion of the page with a title. If the user wanted to see the entire newspaper page, double-clicking on the icon with the mouse or other pointer device could cause the entire page to appear at a higher magnification, for example. Thus, individual icons can be used on the editor's table to represent separate information components.

Furthermore, groups of icons can be organized into "piles" on the editor's table. Each pile consists of a plurality of overlapping icons, from which individual icons can be selected. Since most users tend to organize paper documents in piles on a conventional desk, the use of "piles" of icons has an intuitive appeal.

According to preferred features of the system of the present invention, users are able to perform new or refined searches by examining the results of a previous search, and then selecting one or more icons from the "pile" or "piles" of results as the basis for an additional search.

One illustrative example of a method for performing such a search is as follows. First, the user selects at least one icon by placing it in a search window, for example. Next, the user specifies how the icon is to be used for the search, such as requesting any similar information components. Finally, the search is executed, and the results are again displayed as one or more piles of icons. Thus, IC Interface 42 enables users to interact with the system of the present invention in a manner which preserves the functionality and intuitive appeal of the information components.

Figure 9:
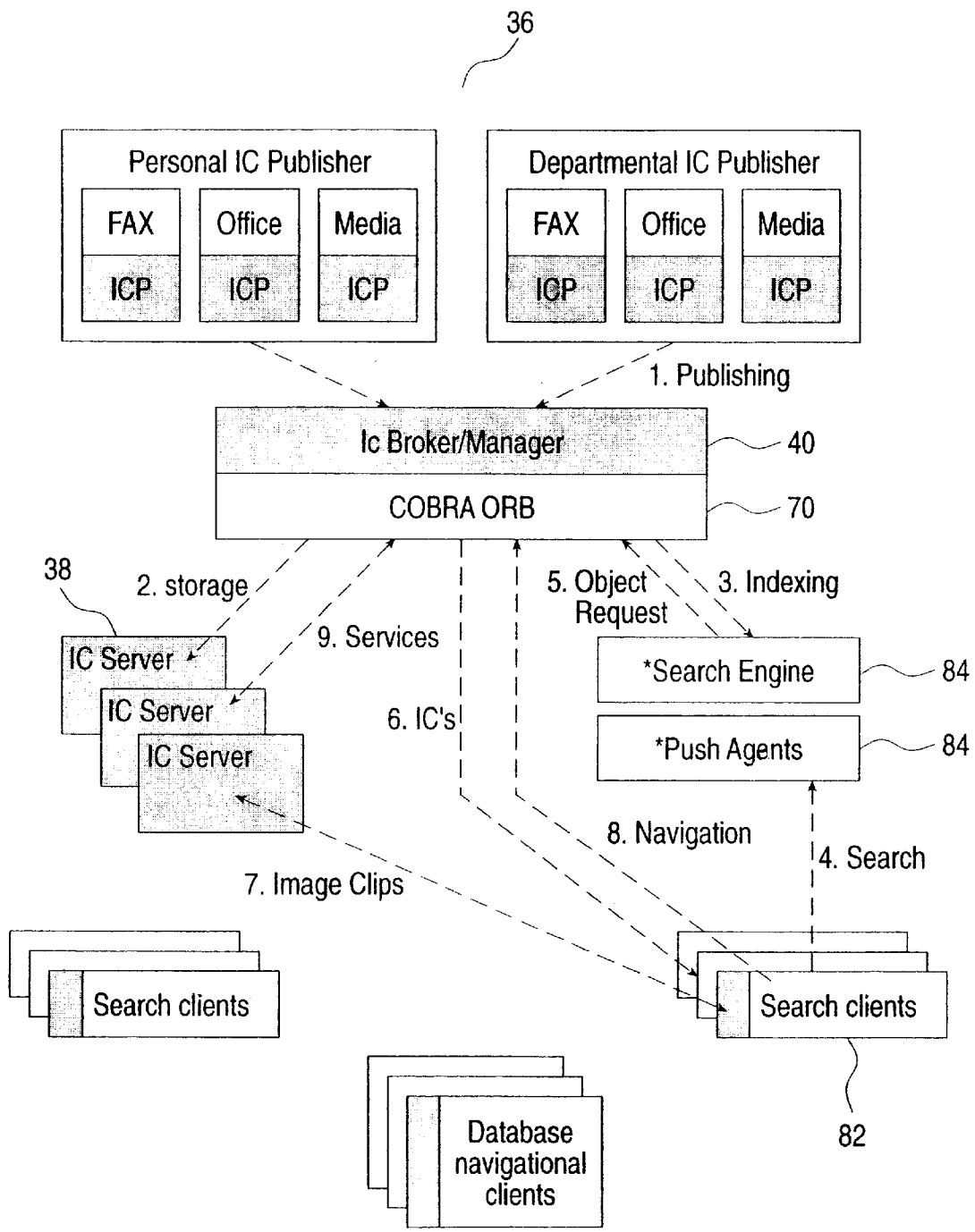
FIG. 9 is a general overview of one application of the system of the present invention.

A more general diagram of the flow of data from IC Publisher 36 to IC Broker 40 and thence to IC Server 38 is shown in FIG. 9. Essentially, data is first captured by IC Publisher 36. Next, captured data is sent to content analyzer 58 of IC Broker 40, preferably by a combination of an HTTP daemon and the IIOP communication protocol. Analyzed data is then sent to component identifier 60, which decomposes the data into data elements such as textual information, graphic images, sounds and video streams. The data elements then go to component classifier 62, which places the information component into one of a number of different classes. The classified information component then goes to IC Broker 40, where component generator 64 transforms the classified information component into a standard Java Bean object. The Java Bean object is stored in database 66, from which it can be retrieved by IC Manager 68.

Retrieved Java Bean information component objects can be accessed through ORB 70. For example, a client 82 can navigate through the information in database 66, by issuing requests to ORB 70. Information component Java Bean objects can be directly sent from ORB 70 to client 82, for example through Internet server 72 (not shown). Alternatively and preferably, IC Server 38 can send an object image clip to client 82 in response to a request. A user could also potentially search through the information in database 66 by accessing search/push engine 84, which would also submit requests through ORB 70.

While the invention has been described with respect to a limited number of embodiments, it will be appreciated that many variations, modifications and other applications of the invention may be made.

What is claimed is:

1. An IC Server for serving stored information to a client Web browser, said IC Server comprising:

(a) a database for storing the stored information; and (b) an image processor for accessing the stored information from said database and transforming the stored information into a Searchable Image Format (SIF) file, said SIF file being accessible by the client Web browser, such that the stored information is displayable by the client Web browser. The IC Server further comprising a polygon sent from the Web browser to the IC Server, the polygon specifying a portion of the stored information to be sent to the client Web browser, such that the Searchable Image Format file includes a raster image of the portion of the stored information and such that substantially only the portion of the stored information is displayed by the client Web browser.

2. The IC Server of claim 1, file includes:

(A) a raster image of the stored information, (B) a text of the stored information; and (C) a relationship between said text and said raster image, such that a location of said text within said raster image is specified.

3. The IC Server of claim 1, further comprising an IC View Server for enabling a display of an image from the stored information on the client Web browser.

4. The IC Server of claim 3, further comprising an IC Print Server for enabling printing of the stored information.

5. The IC Server of claim 4, wherein said image processor, said IC View Server and said IC Print Server all include at least one Cartridge.

* * * * *

UNITED STATES PATENT AND TRADEMARK OFFICE
CERTIFICATE OF CORRECTION

PATENT NO.: 6,161,107
DATED: December 12, 2000
INVENTOR(S): Yonatan Pesach STERN It is certified that error appears in the above-identified patent and that said Letters Patent is hereby corrected as shown below:

- Column 22, Line 9: after "claim 1" insert "wherein said SIF".

Signed and Sealed this

Twenty-ninth Day of May, 2001

Attest:

NICHOLAS P. GODICI

*Attesting Officer*     *Acting Director of the United States Patent and Trademark Office*